United States Patent [19]
Teller

[11] 3,721,066
[45] March 20, 1973

[54] PROCESS FOR RECOVERY OF ACID GASES

[75] Inventor: Aaron J. Teller, Great Neck, N.Y.

[73] Assignee: Teller Environmental Systems, Inc., New York, N.Y.

[22] Filed: Dec. 29, 1970

[21] Appl. No.: 102,561

[52] U.S. Cl. .................................... 55/71, 55/74
[51] Int. Cl. ........................................ B01d 53/04
[58] Field of Search ...... 55/68, 71, 73, 74; 23/25, 88, 23/153

[56] References Cited

UNITED STATES PATENTS

| | | | |
|---|---|---|---|
| 2,686,151 | 8/1954 | Feldbayer et al. | 23/153 |
| 2,903,434 | 9/1959 | Gloss | 252/441 |
| 3,503,184 | 3/1970 | Knapp et al. | 55/71 |

OTHER PUBLICATIONS

Winchell et al., Elements of Optical Mineralogy, Wiley & Sons, Inc., 1951, pp. 254 and 255.

Primary Examiner—Charles N. Hart
Attorney—Curtis, Morris & Safford

[57] ABSTRACT

A process for removing an acid gas component from a gas stream is shown. The gas is passed in contact with finely divided nepheline syenite which selectively sorbs acid components such as hydrogen fluoride, sulfur dioxide and silicon tetrafluoride from the gas. The nepheline syenite is desirably treated with water to increase its sorbant characteristics.

10 Claims, No Drawings

PROCESS FOR RECOVERY OF ACID GASES

This invention relates broadly to a process for removing an acid gas component from a gas. More specifically, this invention relates to a process for selectively sorbing acid gas components from a gas stream by passing that stream in contact with a natural ore which has been treated to improve its sorbant characteristics. Still more specifically, this invention relates to a process for recovering hydrogen fluoride, silicon tetrafluoride and/or sulfur dioxide from the gases formed in the manufacture of aluminum by electrolysis of molten alumina.

The processes of this invention are particularly useful in the recovery or removal of gaseous acids such as hydrogen fluoride, silicon tetrafluoride and sulfur dioxide from waste gases produced in the manufacture of glass or fertilizer or in the manufacture of aluminum by the well-known electrolytic process. In the latter process alumina is dissolved in molten cryolite ($Na_3AlF_6$ and the molten mixture is subjected to an electrolytic direct current. Under the influence of this current, oxygen is released from the alumina and is deposited at the anode where it is burned, while the molten aluminum is deposited on the cathode. The molten aluminum, which is heavier than the molten cryolite at the temperatures of the electrolytic process, accumulates at the bottom of the vessel and is recovered.

The electrolytic process causes certain gases to form. These gases are primarily hydrogen fluoride, silicon tetrafluoride and sulfur dioxide. Each of these gaseous components, if permitted to escape from the processing area, poses a significant danger to plant personnel and to the environment. Each is notoriously deleterious to health and is a noxious air pollutant. The hydrogen fluoride and silicon tetrafluoride, furthermore, includes fluorine values which if recovered can improve the economics of the overall electrolytic process.

In view of the dangers in permitting the acid gases to escape from the electrolytic zone and the economic loss to the process in not recovering fluorine values in those acid gases, efforts have been made to remove and recover the acid gas components from the electrolytic off-gases. One prior art process which has been used includes the scrubbing of the off-gases with media which selectively absorb or chemically react with one or more acid components in the gas stream. A method which has been suggested for recovery of fluorine values in the off-gas is that disclosed in copending application Ser. No. 667,801 and now abandoned. In this process, an impregnated alumina is used to sorb hydrogen fluoride from a gas stream passed in contact with it.

The chemical scrubbing and chemical reaction processes which have heretofore been used have the distinct disadvantage of requiring substantial capital investment in plant and equipment for removing the relatively small amounts of acid components in the gases emanating from the electrolytic area. Operating costs for those plants are also high. Still a further disadvantage inherent in the scrubbing and chemical reaction processes stems from the relatively low concentrations of the acid components in the off-gases and the low rates of sorption and/or reaction which result.

It is thus the primary object of the present invention to provide a process for selectively sorbing acid gas components from a gas stream by a process which requires a minimum capital investment and minimum operating cost.

It is a further and more specific object of this invention to provide a process for selectively sorbing hydrogen fluoride, silicon tetrafluoride and/or sulfur dioxide from the gas emanating from an electrolytic area in a process for the manufacture of aluminum or for the manufacture of glass or fertilizer.

It is still a further object of this invention to provide a process for effectively removing and recovering the acid gas components by passing them over a readily available, inexpensive sorbing medium from which the fluorine values can thereafter be recovered.

It has now been found that acid gas components can be sorbed from a gas stream by passing that gas stream in contact with a finely divided natural ore known as nepheline syenite. The nepheline syenite is desirably in the form of particles of broadly from 4 to 500 mesh. For bag filter use the particles are preferably of 200 to 325 mesh; for fixed or moving bed applications the particles are preferably from 6 to 14 mesh; and for pipeline reactions they are preferably from 200 to 500 mesh.

It has been found that the sorbant properties of the nepheline syenite can be substantially improved by treating the syenite with water in such amount as will ensure the adsorption by it of a substantial amount of water but less than such amount as will cause an excess of supernatant to form. Desirably, the syenite is treated at ambient conditions with from 10 to 50 pounds of water per 100 pounds of syenite and is subsequently dried. The dried ore, in the particle sizes disclosed above, has extremely satisfactory sorbant properties for selectively removing hydrogen fluoride, silicon tetrafluoride and sulfur dioxide from a gas stream passed in contact with it.

The gases emanating from the electrolytic process area via hoods over the electrolytic baths or in the air around these baths can be first pretreated to remove particulates by any satisfactory procedure. For example, the particulates can be removed by scrubbing or by inertial impact processes as are taught, for example, in U. S. Pat. No. 3,324,630, before the gas is passed to the process of this invention.

The sorbing medium of this invention is the natural ore known as nepheline syenite. Nepheline syenite is found in deposits in Canada and in the United States and is used primarily for the manufacture of glass. A typical analysis of nepheline syenite is as follows:

| | |
|---|---|
| Silica | 59–61% |
| Alumina | 23–24% |
| Calcia | 0.6–0.7% |
| Ferric oxide | <0.1% |
| Magnesia | <0.2% |
| Soda | 9.5–10.5% |
| Potash | 4.5–5% |
| Loss on ignition | <1% |

It has been found that best results are obtained in baghouse contacting operations if the syenite is in the form of particles of from 200 to 325 mesh.

Desirably the finely divided ore is first treated with an amount of water such that the ore adsorbs the water with little or no excess supernatant liquid. The finely divided ore is than dried before being used in the process of this invention. It has been found that the finely divided ore should be treated with from 10 to 50 pounds of water per 100 pounds of ore and then dried in order to achieve the best sorbtion characteristic with respect to the acid components.

The mechanism by which the acid components are removed from the gas stream is herein referred to as sorption, as it is not known whether the mechanism is one of absorption or adsorption or a combination of these mechanisms.

Finely divided nepheline syenite may be employed in the form of a fixed or a moving or a fluidized bed through which a stream of gas containing the acid components is passed. The gases desirably pass through and in contact with the finely divided nepheline syenite at a temperature of broadly from 100° to 400°F. and preferably from 100° to 200°F. The space velocity of the gas through the bed of nepheline syenite is desirably from $10^2$ to $10^7$ hr.$^{-1}$ and preferably is from $10^4$ to $10^6$ hr.$^{-1}$. It will be understood by those skilled in the art that the preferred process temperatures and space velocities depend upon the concentration of the acid gases, the thickness of the bed of sorbing medium, the average particle size of the sorbing medium and the amount of acid gases already sorbed.

The following examples further disclose the advantages obtained with the process of this invention.

EXAMPLE I

Twenty-five lbs. of nepheline syenite ore having a particle size of from 200 to 325 mesh were treated with 8 lbs. of water and then dried to equilibrium with air at 200°F. The treated material was blown into a baghouse having a filter area of 120 square feet.

A gas containing 100 ppm hydrogen fluoride (HF) and 80 ppm sulfur dioxide ($SO_2$) was passed through the solid deposited on the surface of the bag filter. The gas was passed through the solid at a temperature of 110°F. and at a rate of 250 cubic feet per minute for a total period of 30 hours. The space velocity in the bed of solid was approximately 42,000 hr.$^{-1}$.

For the first 20 hours the gas leaving the filter area contained less than 2 ppm hydrogen fluoride and less than 2 ppm sulfur dioxide. During the first 10 hours the concentrations of these gases were less than 0.2 ppm. After 20 hours of continuous operation, the concentrations of the acid gases rose and during the period between 20 and 30 hours of operation, the concentrations of acid gases in the effluent were about 6 ppm and 5 ppm hydrogen fluoride and sulfur dioxide respectively.

EXAMPLE II

Twenty-five lbs. of nepheline syenite ore of a particle size of 200 to 325 mesh were blown into a baghouse having a filter area of 120 square feet. A gas containing 80 ppm hydrogen fluoride and 65 ppm sulfur dioxide was passed through the solid deposited on the surface of the bag filter. The gas was at a temperature of 100° to 120°F. and was introduced into the filter at a rate of 250 cubic feet per minute. The space velocity in the bed of solid was approximately 50,000 hr.$^{-1}$. The gas was passed through the solid for a total period of 24 hours.

During the first 10 hours of continuous operation the concentration of hydrogen fluoride and the concentration of sulfur dioxide in the effluent gas were each less than 2 ppm. After 10 hours the effluent concentration of each of these gases increased and at the end of 24 hours was 15 ppm.

It can be seen by comparison of the results in Examples I and II that the water-treated nepheline syenite of Example I has a substantially higher sorbant capacity than the untreated ore of Example II when tested under similar process conditions.

EXAMPLE III

Twenty lbs. of nepheline syenite ore having a particle size of 8 to 14 mesh were treated with 7 pounds of water. The addition of the water did not cause a supernatant liquid to appear. The treated ore was dried with air at 180°F. and was placed on a screen to a depth of 2 inches.

A gas containing from 100 to 200 ppm hydrogen fluoride and 90 to 190 ppm sulfur dioxide was fed upwardly through the bed at a temperature of from 120° to 150°F. and at a rate of 120 cubic feet per minute. The space velocity in the ore was approximately 20,000 hr.$^{-1}$. The gas was passed through the bed of ore for a period of 24 hours.

During the first 20 hours of continuous operation the concentrations of sulfur dioxide and of hydrogen fluoride in the effluent gas were each less than 2 ppm. After 20 hours of continuous operation the concentrations of these acid gases in the effluent gas rose and after 24 hours of continuous operation, they were in excess of 10 ppm.

The process of this invention can be used for removing the acid gas components from the hood or skirt gases in the electrolytic process for aluminum manufacture. As suggested above, the gases can be first processed to remove particulates and thereafter can be passed in contact with the finely divided nepheline syenite ore of this invention. The process is effective with the relatively higher concentrations of acid gases found in the skirt or hood gases but is equally effective with the lower concentrations of these gases found in the plant air surrounding the electrolytic process.

What is claimed is:

1. A process for removing an acid gas component from a gas stream, comprising the steps of: passing said gas stream in contact with finely divided nepheline syenite, said nepheline syenite having first been treated with water; and removing a gas stream therefrom from which said acid gas component has been selectively sorbed.

2. A process according to claim 1 wherein said acid gas is selected from the group consisting of hydrogen fluoride, silicon tetrafluoride and sulfur dioxide.

3. A process according to claim 1 wherein the said nepheline syenite is in the form of particles of from 4 to 500 mesh.

4. A process according to claim 1 wherein said gas stream is at a temperature of from 100° to 400°F. and is passed in contact with said nepheline syenite at a space velocity of from $10^2$ to $10^7$ hr.$^{-1}$.

5. A process for selectively sorbing an acid gas component selected from the group consisting of hydrogen fluoride, silicon tetrafluoride and sulfur dioxide from a gas stream, comprising the steps of: passing said gas stream at a temperature of from 100° to 400°F. and at a space velocity of from $10^2$ to $10^7$ hr.$^{-1}$ in contact with finely divided nepheline syenite having a particle size of 4 to 500 mesh, said nepheline syenite having first been treated with water; and removing a gas stream from said bed from which said acid component has been selectively sorbed.

6. A process according to claim 5 wherein said nepheline syenite is first treated with from 10 to 50 pounds of water per 100 pounds of nepheline syenite and then dried in order to increase the sorbant characteristics of said syenite for said acid gas components.

7. A process according to claim 5 wherein said acid gas component is hydrogen fluoride.

8. A process according to claim 5 wherein said acid gas component is sulfur dioxide.

9. A process for improving the sorbant characteristics of nepheline syenite with respect to acid gases, comprising the steps of: treating said nepheline syenite with water so as to adsorb water thereon and thereafter drying said nepheline syenite.

10. A process according to claim 9 wherein said nepheline syenite is treated with 10 to 50 pounds of water per 100 pounds of syenite.

* * * * *